United States Patent [19]

Itoh et al.

[11] Patent Number: 5,527,862
[45] Date of Patent: Jun. 18, 1996

[54] DIORGANOPOLYSILOXANE-RIGID AROMATIC POLYMER COMPOSITIONS AND PREPARATION THEREOF

[75] Inventors: Maki Itoh; Akihito Sakakibara, both of Kanagawa Prefecture, Japan

[73] Assignee: Dow Corning Asia, Ltd., Tokyo, Japan

[21] Appl. No.: 295,447

[22] Filed: Aug. 24, 1994

[30] Foreign Application Priority Data

Aug. 25, 1993 [JP] Japan .................................. 5-210248
Aug. 25, 1993 [JP] Japan .................................. 5-210525

[51] Int. Cl.$^6$ .................................................. C08G 65/48
[52] U.S. Cl. ...................... 525/393; 525/431; 525/477; 525/509; 528/38
[58] Field of Search ........................... 525/431, 477, 525/393, 509; 528/38

[56] References Cited

U.S. PATENT DOCUMENTS

| | | | |
|---|---|---|---|
| 3,288,754 | 11/1966 | Green | 260/47 |
| 3,553,282 | 1/1971 | Holub | 525/431 |
| 4,558,110 | 12/1985 | Lee | 525/477 |
| 4,604,477 | 8/1986 | Rich | 556/436 |
| 4,618,534 | 10/1986 | Iwama et al. | 525/431 |
| 4,672,099 | 6/1987 | Kunimune et al. | 525/431 |
| 4,855,078 | 8/1989 | Leslie | 252/582 |
| 4,981,940 | 1/1991 | Konotsune et al. | 528/38 |
| 5,028,681 | 7/1991 | Peters | 525/431 |
| 5,260,352 | 11/1993 | Kawakami | 523/107 |
| 5,346,979 | 9/1994 | Okinoshima et al. | 525/431 |

FOREIGN PATENT DOCUMENTS

161549 11/1985 European Pat. Off. .
1204931 8/1989 Japan .

OTHER PUBLICATIONS

Journal of Polymer Science: Part A: Polymer Chemistry, vol. 32, 1581–1592 (1994).
Motowo Takayanagi, Kobunshi, vol. 33, pp. 615–619 (1984).
Rikio Yokota, Kinozairyo (Function and Mtls.) Oct. issue, pp. 22–32, (1988).
Motowo Takayanagi et al, J. Macromol. Sci. Phys., vol. B17, pp. 591–615 (1980).
Motowo Takayanagi et al., J. Appl. Polym. Sci., vol. 29, pp. 2547–2558 (1984).
D. R. Moore et al, J. Appl. Polym. Sci., vol. 32, pp. 6299–6315, (1986).
Itaru Mita, Kemikaru Enjiniyaringu, August issue, pp. 69–73, (1990).
Kohei Sanni et al., J. Polym. Sci., Part A: Polym. Chem., vol. 31, pp. 597–602 (1993).
J. C. Painter et al, ACS Polym. Prepr., vol. 32 No. 1, p. 208 (1991).

*Primary Examiner*—Mark D. Sweet
*Attorney, Agent, or Firm*—Alexander Weitz

[57] ABSTRACT

Methods are disclosed for the blending of inherently incompatible polymer systems to provide compositions comprising (i) 1 to 99.99 percent by weight of a diorganopolysiloxane; and (ii) 0.01 to 99 percent by weight of an organopolysiloxane-grafted rigid linear aromatic polymer selected from the group consisting of organopolysiloxane-grafted polyimide and organopolysiloxane-grafted polybenzobisoxazole.

25 Claims, No Drawings

DIORGANOPOLYSILOXANE-RIGID AROMATIC POLYMER COMPOSITIONS AND PREPARATION THEREOF

FIELD OF THE INVENTION

The present invention relates to novel diorganopolysiloxane compositions and cured products therefrom, wherein aromatic polyimide polymer or polybenzobisoxazole polymer is an essential component. The invention further relates to methods for the preparation of the compositions.

BACKGROUND OF THE INVENTION

Fiber-reinforced composites are one example of the conversion of polymer materials into composites with the goal of application as structural materials that must exhibit high stiffness and high strength. Molecular composites have been proposed for the purpose of realizing the concept of macroscopic fiber-reinforced composites on the molecular level (see, for example, Motowo Takayanagi, Kobunshi, volume 33, page 615 (1984), and Rikio Yokota, Kino Zairyo (Functionand Materials), October issue, page 22 (1988)). Molecular composites consist of polymer with a rigid linear main chain that is molecularly dispersed in a flexible polymer matrix. Since the rigid linear polymer has a very large aspect ratio in the absence of aggregation, a reinforcing activity close to that of a fiber-reinforced composite can theoretically be obtained. Moreover, high-performance materials can be expected because, unlike fibers, there are also no defects at the level of the individual molecules.

Generally, however, the molecular dispersion of rigid linear polymers in flexible polymers is problematic. The various attempts at solving this problem have consisted of for example, (i) the synthesis of a block copolymer of poly(p-phenylene terephthalamide) (=rigid linear polymer) and nylon 6 (=flexible polymer) followed by dispersion of this block copolymer in nylon 6 (Motowo Takayanagi et al J. Macromol. Sci.-Phys., volume B17, page 591 (1980)), (ii) metalation of poly(p-phenylene terephthalamidei) (Motowo Takayanagi et al., J. Appl. Polym. Sci., volume 29, page 2547 (1984)), (iii) polymerization of acrylamide by metalation-generated poly (p-phenylene-terephthalamide) anion with the simultaneous production of a nylon 3 matrix and nylon 3-grafted poly(p-phenylene terephthalamide) (D. R. Moore et al., J. Appl. Polym. Sci., volume 32, page 6299 (1986)), (iv) blending the polyamic acid precursors of an wholly-aromatic rigid linear polyimide and a polyimide that contains flexible groups in its main chain and then thermally imidizing this blend (Itaru Mira, Kemikaru Enjiniyaringu [Chemical Engineering], August issue, page 69 (1990)), (v) conducting polymerization to give rigid linear poller in a solution of matrix poller (Kohei Sanui et al, J. Polym. Sci.: Part A: Polym. Chem., volume 31, page 597 (1993), and so forth), and (vi) utilization of hygrogen bonds (J. C. Painter et al., ACS Polym. Prepr., volume 32, number 1, page 208 (1991)).

On the other hand, since polydimethylsiloxanes have a low intermolecular cohesive energy, the pure rubber has a low mechanical strength and is typically reinforced by filling with reinforcing silica (see Kunio Itoh (ed.), *Shirikoon Handobukku* [*Silicone Handbook*], Nikkan Kogyo Shinbun-sha (1990), etc.).

The above-mentioned molecular composites are concerned mainly with plastics, and the use of silicone rubber as a matrix has not been reported up to now. If a rigid linear polymer could be dispersed in a diorganopolysiloxane matrix, it would be possible to provide a novel reinforcing method for silicone rubbers. However, rigid linear polymers and polysiloxanes are inherently incompatible.

SUMMARY OF THE INVENTION

An object of the present invention is to provide rigid linear polymers having compatibility with polysiloxanes and therefore to provide compositions that contain both types of polymers, as well as cured products therefrom. The aforesaid object is achieved by the disclosure of diorganopolysiloxane compositions comprising:

(i) 1 to 99.99 weight % of a diorganopolysiloxane (ii) 0.01 to 99 weight % of a organopolysiloxane-grafted rigid linear aromatic polymer selected from the group consisting of organopolysiloxane-grafted polyimides and organopolysiloxane-grafted polybenzobisoxazoles.

The present invention also teaches a method for preparing the above compositions that contain polysiloxane and aromatic polyimide or polybenzobisoxazole (i.e., rigid linear polymers) and a method for preparing the cured products of such compositions.

The method of the present invention thus makes possible the preparation of molecular composites comprising the dispersion of rigid linear aromatic polymer in diorganopolysiloxane. This provides a novel reinforcing method for both crosslinked and uncrosslinked silicone materials.

The present invention has been described in Japanese Application for Patent Hei 5-210248 and Hei 5-210525, filed Aug. 25, 1993, the full disclosures of which are hereby incorporated by reference.

DETAILED DESCRIPTION OF THE INVENTION

Preferred organopolysiloxane-grafted aromatic polyimides suitable for use in the present invention comprise copolymers that are composed of units with formulas (I) and (II)

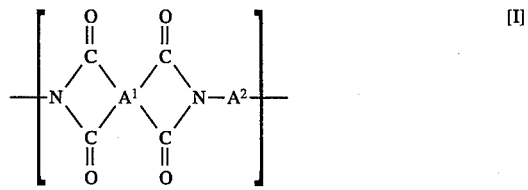

[I]

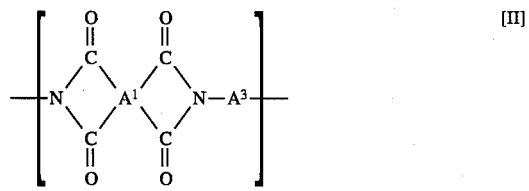

[II]

wherein the unit (I)/unit (II) molar ratio is in the range of 100/0 to 1/99. In these formulas, $A^1$ denotes a tetravalent aromatic group and $A^2$ denotes a divalent aromatic group on which there is bonded one or two organopolysiloxanes with formula (III) per unit with formula (I).

$$-R^1-\overset{R^2}{\underset{R^3}{\overset{|}{\underset{|}{Si}}}}\left(-O-\overset{R^4}{\underset{R^5}{\overset{|}{\underset{|}{Si}}}}\right)_n R^6 \quad [III]$$

In the above formula, $R^1$ denotes a divalent organic group, $R^2$ through $R^6$ denote monovalent organic groups which may be the same or different, and n is an integer with a value of 1 or greater.

$A^3$ comprises at least 1 selection from reactive side chain-free divalent aromatic groups and reactive side chain-substituted divalent aromatic groups, wherein the molar ratio of reactive side chain-free divalent aromatic groups to reactive side chain-substituted divalent aromatic groups is in the range of 100/0 to 0/100.

This aromatic polyimide must have a degree of polymerization (DP) based on units (I) and (II) off at least 5. A reinforcing activity is not exhibited in the corresponding molecular composites when the DP is 4 or less.

The polyamic acid and derivatives thereof that are the precursor polymers for the subject polyimides comprise copolymers whose units can be expressed by formulas (IV) and (V)

[IV]

[V]

in which $A^1$, $A^2$, and $A^3$ are the same as described above, and $R^7$ denotes hydroxyl, alkoxy, dialkylamino, or trialkylsiloxy.

The tetravalent aromatic group denoted by $A^1$ in the above formulas is exemplified by $C_6$ to $C_{30}$ tetravalent groups such as and combinations of these skeletons; however, the present invention is not limited to these examples.

The divalent aromatic group moiety of $A^2$ (exclusive of the side chains) and the divalent aromatic group moiety of $A^3$ (exclusive of any reactive substituents) are exemplified by

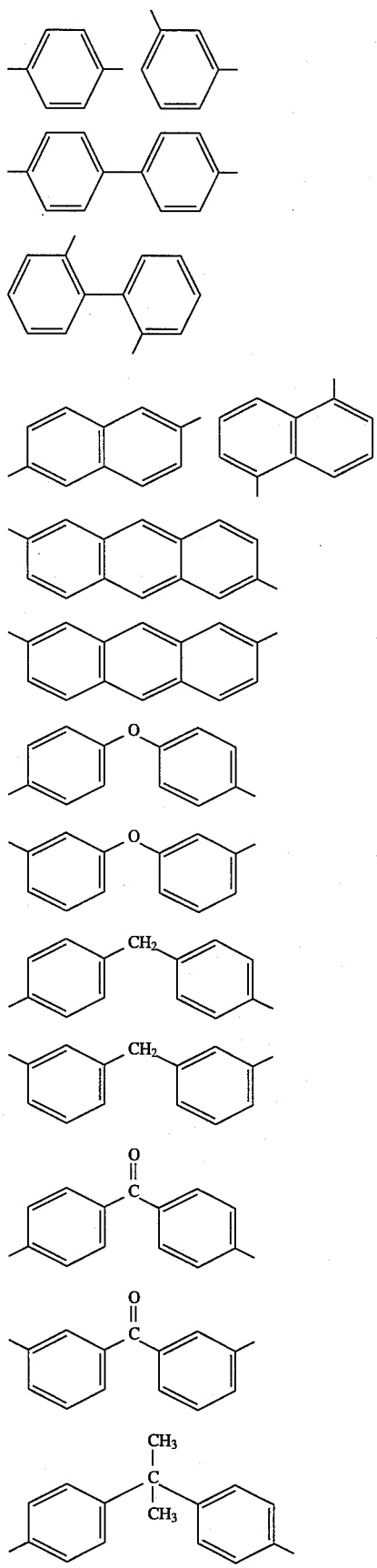

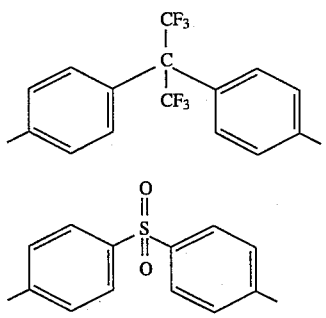

and by combinations of the preceding (groups having 6 to 60 carbon atoms are preferred). However, the present invention is not limited to these examples.

The divalent organic group indicated by $R^1$ in formula (III) is exemplified by alkylene, oxyalkylene, phenylenealkylene, phenyleneoxyaikylene, etc.; however, oxyalkylene is preferred from the standpoint of ease of acquisition. $R^2$ through $R^6$ indicate monovalent organic groups, and examples here include alkyl groups such as methyl, ethyl, propyl, octyl, etc.; substituted alkyl groups such as 2-phenylethyl, 2-phenylpropyl, 3,3,3-trifluoropropyl, etc.; aryl groups such as phenyl, etc.; and substituted aryl groups such as tolyl, etc. In regard to $R^6$, methyl, n-butyl, sec-butyl, tert-butyl, and phenyl are desirable from the standpoint of ease of acquisition of starting material for the hydroorganopolysiloxane precursor with formula (VI)

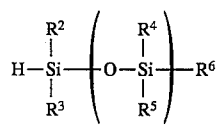

[VI]

in which $R^2$ through $R^6$ have the same definitions as above and the subscript n is a positive integer, preferably 1 to 5,000.

The reactive side chain-containing divalent aromatic groups encompassed by $A^3$ contain one or more groups —$R^8$Q bonded as substituents on aromatic groups as described above for reactive side chain-free $A^3$. $R^8$ denotes a divalent organic group and is exemplified by alkylene, oxyalkylene, phenylenealkylene, phenyleneoxyalkylene, etc.; however, oxyalkylene is preferred from the standpoint of ease of acquisition. Q is exemplified by vinyl, acryloyl, methacryloyl, hydroxyl, amino, carboxyl, epoxy, SiH, SiOH, alkoxysilyl, etc. Vinyl, acryloyl, and methacryloyl, are preferred from the standpoint of ease of synthesis.

The polyamic acids and derivatives thereof with formulas (IV) and (V) can be prepared as follows. For example, the polyamic acid ($R^7$=OH) is obtained by reacting equimolar amounts of aromatic tetracarboxylic dianhydride with formula (VII)

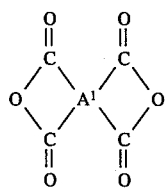

[VII]

wherein $A^1$ is defined as above, and aromatic diamino compounds with formulas (VIII) and (IX)

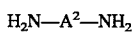 (VIII)

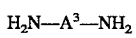 (IX)

where $A^2$ and $A^3$ are defined as above. Polyamic acid derivatives in which $R^7$=trialkylsiloxy can be obtained by reacting tetracarboxylic dianhydride (VII) with compounds prepared by the trialkylsilylation of diamino compounds (VIII) and (IX). For $R^7$=alkoxy, dialkylamino group, and so forth, the particular derivative is obtained by reacting the aromatic tetracarboxylic acid derivative with formula (X)

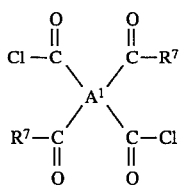

where $R^7$ and $A^1$ are defined above, with aromatic diamino compounds with formulas (VIII) and (IX).

The compounds with formula (VIII), which are polysiloxane chain-containing macromonomers, can be synthesized, for example, by first synthesizing a dinitro compound-containing organopolysiloxane by running a catalyzed hydrosilylation reaction between hydrogen-terminated organopolysiloxane (VI) and a compound comprising the dinitro-substituted aromatic moiety of $A^2$ on which one or two organic groups having terminal ethylenic unsaturation are bonded as substituents. The synthesis is concluded by reduction of the nitro groups.

Methods are known for the preparation of hydrogen-terminated organopolysiloxane (VI).

The substituents exhibiting terminal ethylenic unsaturation on the dinitro compound are exemplified by —CH=CH$_2$, —CH$_2$CH=CH$_2$, —CH$_2$CH$_2$CH=CH$_2$, —CH(CH$_3$)CH=CH$_2$, —(CH$_2$)$_6$CH=CH$_2$, —OCH=CH$_2$, —OCH$_2$CH=CH$_2$, —OCH$_2$CH$_2$CH=CH$_2$, —OCH(CH$_3$)CH=CH$_2$, —O(CH$_2$)$_6$CH=CH$_2$, and so forth. Preferred on the basis of ease of starting material acquisition are —OCH=CH$_2$, —OCH$_2$CH=CH$_2$, —OCH$_2$CH$_2$CH=CH$_2$, —OCH(CH$_3$)CH=CH$_2$, —O(CH$_2$)$_6$CH=CH$_2$, and so forth. These compounds are generally not available commercially, but they can be synthesized, for example, by the procedure provided below in the reference examples.

The subject hydrosilylation reaction is run in the presence of catalyst and is preferably run in solvent. A platinum catalyst is most commonly used as the catalyst, for example, chloroplatinic acid, platinum-divinyltetramethyldisiloxane complexes, Pt/C, and so forth, but transition metal catalysts such as (Ph$_3$P)$_3$RhCl (Ph=phenyl), (Ph$_2$PH)$_3$RhCl, (Ph$_3$P)$_3$(CO)RhH, and other transition metal catalysts containing Co(I), Pd(II), and Ru(II) may also be employed. Suitable catalyst additions generally correspond to approximately $\frac{1}{10}^4$ to $\frac{1}{10}^2$ moles per 1 mole carbon-carbon double bond. Usable solvents are exemplified by aromatic hydrocarbon solvents such as benzene, toluene, xylene, and so forth; aliphatic hydrocarbon solvents such as hexane, heptane, and so forth; ether solvents such as diethyl ether, tetrahydrofuran, and so forth; alcohol solvents such as methanol, ethanol, propanol, and so forth; ketone solvents such as acetone, methyl ethyl ketone, and so forth; ester solvents such as ethyl acetate, butyl acetate, and so forth; halohydrocarbon solvents such as chloroform, trichloroethylene, carbon tetrachloride, and so forth; and dimethylformamide, N,N-dimethylacetamide dimethyl sulfoxide, and so forth. The reaction is run at temperatures of 0° C. to 200° C., and preferably 40° C. to 110° C., in a dry inert atmosphere. However, the introduction of small quantities of oxygen may be advantageous depending on the particular catalyst used.

The nitro groups in the aforementioned dinitro compound-containing organopolysiloxane can be reduced to amino groups by, for example, catalytic reduction with hydrogen using a catalyst such as platinum, Raney nickel, platinum/carbon, palladium/carbon, rhodium/alumina, platinum sulfide/carbon sulfide, and so forth. The reaction is preferably run in a solvent, and usable solvents are exemplified by the various solvents listed above and by mixtures of said solvents. The reaction temperature is preferably in the range from room temperature to the reflux temperature of the solvent. The method of reduction is not limited to the method outlined above.

The organopolysiloxane chain of the aromatic diamino compound-containing macromonomer (VIII) may also carry a reactive group or groups capable of bonding with the matrix diorganopolysiloxane. For example, instead of using the hydrogen-terminated organopolysiloxane (VI), organopolysiloxane that has the hydrosilyl group at one terminal and a reactive group at the other terminal can be prepared by known methods and the synthesis can then be run using this organopolysiloxane. The reactive group must not participate in the hydrosilylation or nitro group reduction reactions described above or in any reaction in the polyamic acid polymerization process. An example of such groups is alkoxysilyl.

Among the aromatic diamino compounds (IX), compounds bearing reactive groups on $A^3$ are not generally commercially available. However, compounds of this type can be synthesized by, for example, first protecting the amino groups on an aromatic diaminohydroxy compound, introducing olefin through an ether synthesis between the hydroxy group and a halogenated olefin according to the procedure described in the reference examples below, and then deprotecting the amino groups.

The silylation of the aromatic diamino compounds with formulas (VIII) and (IX) is accomplished using a silylating agent. The silylating agent is exemplified by trialkylhalosilanes such as trimethylchlorosilane, triethylchlorosilane, triphenylchlorosilane, methyldiethylbromosilane, and so forth, and by nitrogenous silylating agents such as hexamethyldisilazane, N,N-diethylaminotrimethylsilane, N, O-bis(trimethylSilyl) carbamate, N-trimethylsilylimidazole, and so forth. If a trialkylhalosilane is used, the addition of a base is then preferred in order to neutralize the hydrogen halide produced as by-product. A catalyst such as trimethylchlorosilane, ammonium sulfate, and so forth, may be added when a nitrogenous silylating agent is used. The silylation reaction may be run, in the absence of solvent or in the various solvents listed above excluding alcohols. The reaction temperature is 0° C. to 200° C. and preferably 20° C. to 140° C.

The aromatic tetracarboxylic acid derivatives with formula (X) are obtained by reacting an aromatic tetracarboxylic dianhydride (VII) with an alkyl alcohol or dialkylamine, to give an aromatic tetracarboxylic acid derivative with formula (XI)

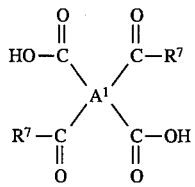

wherein $A^1$ and $R^7$ have the same meaning as described above, and by then reacting (XI) with inorganic halide.

The inorganic halide is exemplified by phosphoryl chloride, thionyl chloride, phosphorus pentachloride, phosphorus trichloride, and so forth. Thionyl chloride is preferred because it has a low boiling point and because the corresponding by-products are gases or low-boiling compounds, which facilitate product recovery. The reaction with inorganic halide (preferably thionyl chloride) can be run without solvent or in the solvents listed above. Zinc chloride, pyridine, iodine, triethylamine, etc., can be used as catalyst, but the use of catalyst may be omitted. The reaction temperature is −50° C. to 140° C. and preferably −30° C. to 120° C.

The polyamic acids and derivatives thereof as described above are preferably synthesized in a dry inert gas atmosphere. The reaction may be run without a solvent, but is preferably carried out in a solvent. Usable solvents are exemplified by the various solvents listed above and by their mixtures. The reaction temperature is preferably −50° C. to 100° C., and is even more preferably in the range of 0° C. to 50° C.

With reference to general formulas (I) through (XI), highly suitable examples of aromatic polyimides for the present invention are as follows:

unit (I)/unit (II) molar ratio =100/0 to 30/70, n=3 to 1,000, $R^1$=$C_2$ to $C_{20}$ oxyalkylene, $R^2$ through $R^5$=methyl or phenyl, and $R^6$=methyl, n-butyl, sec-butyl, tert-butyl, or phenyl.

The following may be cited as optimal examples of $A^1$, $A^2$, and $A^3$ from the standpoint of ease of acquisition:

$A^1 =$

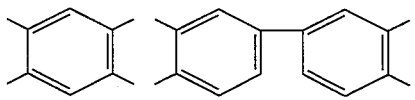

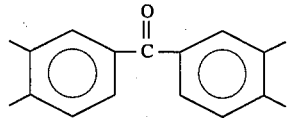

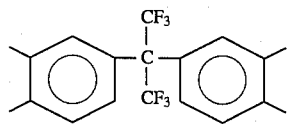

$A^2 =$

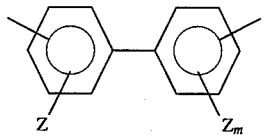

wherein Z is a monovalent polysiloxane with formula (III) and m is 0 or 1, $A^3 =$

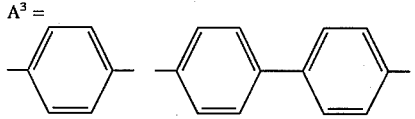

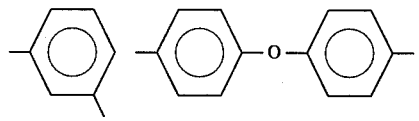

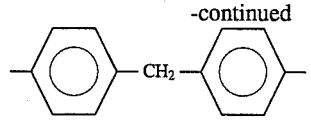

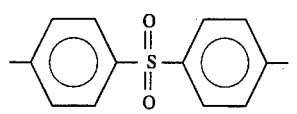

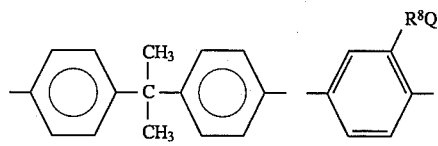

where $R^8$=oxyalkylene and Q=vinyl, and reactive side chain-free divalent aromatic group/reactive side chain-substituted divalent aromatic group molar ratio in $A^3$=100/0 to 50/50.

Preferred organopolysiloxane-grafted aromatic polybenzobisoxazole used in the present invention comprise units with formulas (XII) and (XIII)

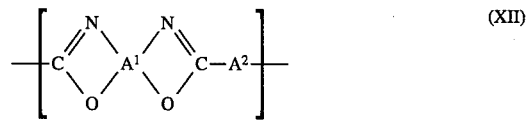

(XII)

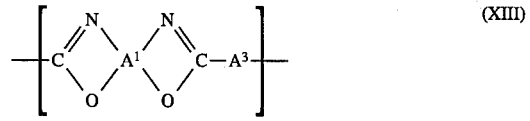

(XIII)

wherein the unit (XII)/unit (XIII) molar ratio is 00/0 to 1/99 and $A^1$, $A^2$ and $A^3$ have their previously defined meanings.

This aromatic polybenzobisoxazole must have a degree of polymerization based on units (XII) and (XIII) of at least 5. A reinforcing activity is not exhibited in the corresponding molecular composites when the DP is 4 or less.

The polyhydroxyamide and derivatives thereof that are precursor polymers for the subject aromatic polybenzobisoxazoles comprise copolymers whose units are expressed by formulas (XIV) and (XV)

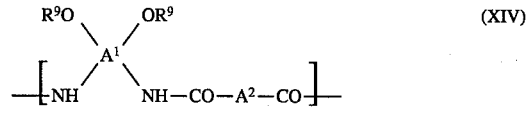

(XIV)

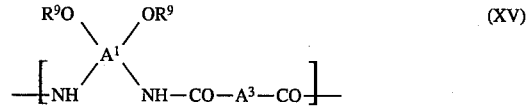

(XV)

in which $A^1$, $A^2$, and $A^3$ are the same as described above, and $R^9$ indicates H or a trialkylsilyl group.

The silylated polyhydroxyamides ($R^9$=trialkylsilyl) are obtained by reacting equimolar amounts of aromatic dicarboxylic acid halides with formulas (XVI) and (XVII)

XCO—$A^2$—COX (XVI)

XCO—$A^3$—COX (XVI)

wherein X denotes a halogen group, preferably the chlorine atom, and $A^2$ and $A^3$ have the same meanings as described above, and silylated aromatic diaminodihydroxy compounds with formula (XVIII)

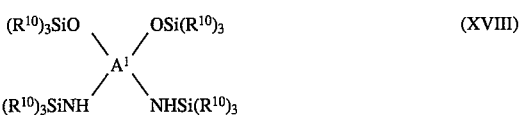

(XVIII)

wherein $R^{10}$ denotes an alkyl group, and $A^1$ has the same meaning as described above. Polyhydroxyamides in which $R^9$ is H are obtained by hydrolyzing these silylated polyhydroxyamides.

The compounds with formula (XVI), which are macromonomers that carry aromatic dicarboxylic acid halide, are prepared by first synthesizing the corresponding aromatic dicarboxylic acid-functionalized organopolysiloxane macromonomer by running a catalyzed hydrosilyiation reaction between hydrogen-terminated organopolysiloxane (VI) and a compound prepared by protecting the carboxyl groups on a compound comprising the di-carboxyl-substituted aromatic group moiety of $A^2$ on which one or two organic groups having terminal ethylenic unsaturation are bonded as substituents. This step concludes with deprotection of the carboxyl groups. The carboxyl groups are then silylated and the resulting compound is reacted with inorganic halide. If the carboxyl groups on the aromatic dicarboxylic acid carrying terminal ethylenically unsaturated organic groups (i. e., a starting compound) have been protected by silylation, the silyl dicarboxytate macromonomer produced by the hydrosilylation reaction with polysiloxane (VI) may be directly reacted with inorganic halide.

The thermal ethylenically unsaturated substituents on the above-mentioned aromatic dicarboxylic acid compounds are the same as those on the dinitro compounds used in the polyamic acid synthesis described above. These compounds are not generally commercially available, but they can be synthesized by, for example, the procedures described below in the reference examples.

The protection step of the carboxyl group that sets up the hydrosilylation reaction is exemplified by esterification with methyl, ethyl, methoxymethyl, tert-butyl, benzyl, beta-p-toluenesulfonylethyl, trialkylsilyl, and so forth. Trialkylsilyl esterification is preferred for the corresponding ease of removal of the protective groups from the product. This silylation reaction is run in the same manner as described above. The hydrosilylation reaction is also the same as described above. Furthermore, the silylation of the carboxyl groups on the aromatic dicarboxylic acid-functionalized organopolysiloxane macromonomer and the reaction with inorganic halide are also the same as described above. The reaction between inorganic halide and carboxylic acid ordinarily produces acid, which induces main chain scission reactions in polysiloxanes. However, if the reaction with inorganic halide is run after the carboxyl groups have been silylated, the by-products are trialkylhalosilanes, etc., and the acid halide can in this manner be synthesized without causing main chain scission reactions in the polysiloxane.

The organopolysiloxane chain in the aromatic dicarboxylic acid halide-functionalized macromer (XVI) may also carry reactive groups capable of bonding with the matrix diorganopolysiloxane. Synthesis can be accomplished in the same manner as described above through the use of organopolysiloxane that has a hydrosilyl group at one terminal and a reactive group at the other terminal. Said reactive group must not participate in the above-mentioned hydrosilylation reaction or in any reaction in the reaction sequence involving the aforementioned inorganic halide. Examples of such groups include alkoxysilyl groups, etc.

Among the aromatic dicarboxylic acid halides with formula (XVII), aromatic dicarboxylic acid halides that carry reactive groups on $A^3$ are not generally commercially available. However, as shown in the reference examples below, such compounds can be obtained, for example, by reacting a terminal olefin-substituted aromatic dicarboxylic acid with inorganic halide as described above. In this case, of course, silylation of the carboxyl groups is unnecessary.

Examples of the silylated aromatic diaminodihydroxy compounds (XVIII) include 1,5-bis(trimethylsilylamino)-2,4-bis(trimethylsiloxy)benzene, 3,3'-bis(trimethylsilylamino)-4,4'-bis(trimethylsiloxy)biphenyl, 2,3'-bis(trimethylsilylamino)-3,4'-bis(trimethylsiloxy)biphenyl, bis(3-trimethylsilylamino-4-trimethylsiloxyphenyl) methane, bis(3-trimethylsilylamino-4-trimethylsitoxyphenyl)ether, bis(3-trimethylsilylamino-4-trimethylsiloxyphenyl)ketone, 2,2-bis(3-trimethylsilylamino-4-trimethylsiloxyphenyl)propane, 2,2-bis(3-trimethylsilylamino-4-trimethylsiloxyphenyl) hexafluoro propane, bis(3-trimethylsilylamino-4-trimethylsiloxyphenyl) sulfone, 2,7-bis(trimethylsilylamino)-3,6-bis(trimethylsiloxy)naphthalene, 1,6-bis(trimethylsilylamino)-2,5-bis(trimethylsiloxy)naphthalene, 1,4-bis(trimethylsilylamino)-5,8-bis(trimethylsiloxy)naphthalene, 2,7-bis(trimethylsilylamino) 3,6-bis(trimethylsiloxy)anthracene, 1,6-bis(trimethylsilylamino)-2,5-bis(trimethylsiloxy)anthracene, 3,10-bis(trimethylsilylamino)-4,9-bis(trimethylsiloxy)perylene, and 2,6-bis(trimethylsilylamino)-3,5-bis(trimethylsiloxy)pyrazine.

However, the present invention is not limited to these compounds, and mixtures of these compounds may also be used. These compounds are not generally commercially available; however, said compounds can be synthesized from the corresponding diaminodihydroxy compounds, as will be described later in the reference examples.

The silylated polyhydroxyamide is obtained by reacting equimolar amounts of dicarboxylic acid halide (XVI) and (XVII) with compound (XVIII) in a dry inert atmosphere. This reaction may be run without a solvent, but is preferably run in a solvent. Usable solvents are exemplified by the various solvents mentioned above (excluding alcohols) and their mixtures. The reaction temperature is preferably −70° C. to 100° C., and is even more preferably −40° C. to 40° C.

The silylated polyhydroxyamide can be hydrolyzed to give the polyhydroxyamide by pouring the reaction solution into an alcohol such as methanol, etc., or by stirring the solvent-free silylated polyhydroxyamide for several hours in an alcohol such as methanol.

With reference to formulas (XII) and (XIII), highly suitable examples of polybenzobisoxazoles for the present invention are as follows:

unit (XII)/unit (XIII) molar ratio =100/0 to 30/70, n=3 to 1,000, $R^1$=$C_2$ to $C_{20}$ oxyalkylene, $R^2$ through $R^5$=methyl or phenyl, $R^6$=methyl, n-butyl, sec-butyl, tert-butyl, or phenyl, $A^1 =$

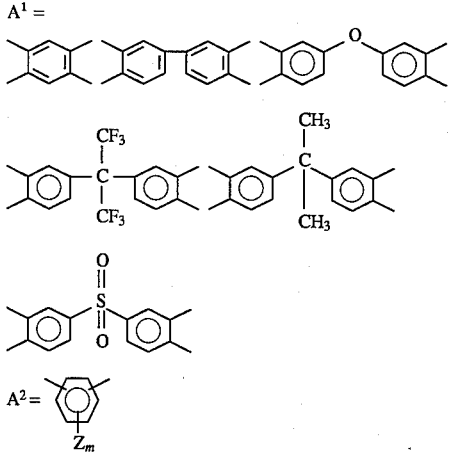

$A^2 = $ [structure with $Z_m$]

wherein, Z is monovalent polysiloxane with formula (III) and m is 1 or 2, $A^3 =$

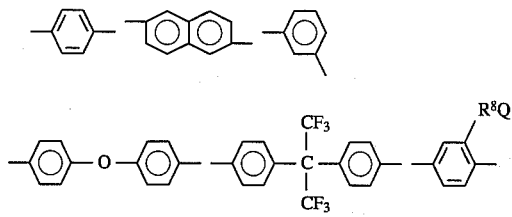

where $R^8$=oxyalkylene and Q=vinyl, and reactive side chain-free divalent aromatic group/reactive side chain-substituted divalent aromatic group molar ratio in $A^3$=100/0 to 50/50.

The diorganopolysiloxane of the present invention is expressed by the formula $R_a R'_b SiO_{(4-a-b)/2}$ in which $1.9 \leq a+b \leq 2.2$ and $0 \leq b \leq 0.2$; R indicates a $C_1$ to $C_5$ alkyl group (optimally methyl), a substituted alkyl group (optimally 2-phenylethyl, 2-phenylpropyl, or 3,3,3-trifluoropropyl), an aryl group (optimally phenyl), or a substituted aryl group (optimally tolyl); and R' indicates an ethylenically unsaturated organic group (optimally vinyl) or a reactive group (optimally silanol, alkoxysilyl, hydroxyl, or mercapto). The viscosity of this compound is 20 to 5,000,000 cS at 25° C.

In order to form the compositions of the invention, the organopolysiloxane-grafted rigid linear aromatic polymer may be blended with the matrix organopolysiloxane, for example, by kneading or melt blending using a kneader, or by solution blending; the latter consists of removal of the solvent from a solution containing both components. Although pollers with highly linear conformations can be expected to exhibit comparatively stronger reinforcing activities even among the rigid linear aromatic polymers under consideration, such polymers may not have a solubility adequate to support solution blending even after the introduction of organopolysiloxane side chains. If in such cases a solvent-soluble precursor polymer exists for the rigid linear aromatic polymer, a blend can first be prepared by the solution method between the organopolysiloxane-grafted precursor polymer and the matrix organopolysiloxane and the matrix-dispersed precursor polymer can thereafter be converted into the rigid linear polymer.

The composition of the present invention is preferably obtained by preparing a homogeneous organic solvent solution of the diorganopolysiloxane plus precursor polymer as described above, removing the organic solvent, and then inducing thermal cyclization of the precursor polymer dispersed in the polysiloxane matrix. The organic solvent may be any solvent that is capable of dissolving both the organopolysiloxane-grafted precursor polymer and the diorganopolysiloxane. Examples of such organic solvents include tetrahydrofuran and mixtures of tetrahydrofuran with a polar solvent such as dimethylacetamide. The imidization of the polyamic acid and derivatives thereof is accomplished by heating to a temperature of 100° C. to 400° C. (preferably 150° C. to 350° C.). The thermally-induced cyclization of the polyhydroxamides and silylated polyhydroxyamides into polybenzobisoxazoles is accomplished by heating to a temperature of 100° C. to 400° C. (preferably 200° C. to 350° C.). In both cases, the atmosphere may be ordinary air or an inert gas, and the pressure may be reduced if desired. The composition should contain about 0.01 to about 99 weight % organopolysiloxane-grafted aromatic polyimide or organopolysiloxane-grafted polybenzobisoxazole. Little effect from filling is obtained at lower contents, while at larger contents the composition becomes indistinguishable from the organopolysiloxane-grafted aromatic polyimide or organopolysiloxane-grafted polybenzobisoxazole itself.

It is also contemplated herein that the organopolysiloxane side chains of the instant organopolysiloxane-grafted rigid linear aromatic polymers may contain functional groups capable of reacting with the diorganopolysiloxane matrix. That is, some of the groups $R^2$ through $R^6$ in formula (III) may be selected from groups such as vinyl, hydroxyl, alkoxysilyl and hydroxysilyl, inter alia. These reactive groups and/or those reactive groups present in above mentioned group $A^3$ allow the instant organopolysiloxane-grafted rigid linear aromatic polymers to be cured by methods well known in the art.

Rubbery elastic material can be obtained from the organopolysiloxane-grafted rigid linear aromatic polymer and diorganopolysiloxane of the present invention through the use of curing agents. Usable curing methods include organoperoxide-mediated crosslinking, condensation reaction-based crosslinking, addition reaction-based crosslinking, etc. The selection of desirable combinations of curing agent and/or curing catalyst and functional groups on the diorganopolysiloxane base polymer as a function of the curing mechanism is well known in the art (see Kunio Itoh (ed.), *Shirik oon Handobukku* (*Silicone Handbook*), Nikkan Kogyo Shinbunsha (1990), etc.). In addition to the reinforcing agent according to the present invention, the diorganopolysiloxane matrix may contain any other known reinforcing agent.

Cured diorganopolysiloxane products containing organopolysiloxane-grafted aromatic polyimide or organopolysiloxane-grafted polybenzobisoxazole are obtained by preparing a homogeneous organic solvent solution of the precursor polymer and diorganopolysiloxane in the same manner as described above, curing the matrix diorganopolysiloxane, either after removal of the organic solvent or in parallel with removal of the organic solvent, and then inducing cyclization of the precursor polymer by heating in the same manner as described above. For the same reasons as described above, subject cured products should contain about 0.01 to about 99 weight % organopolysiloxane-grafted aromatic polyimide or organopolysiloxane-grafted polybenzobisoxazole.

In the absence of the organopolysiloxane side chains, macroscopic phase separation will occur when the solvent is removed from the solution containing the diorganopolysiloxane, even if the precursor polymer is soluble in said solvent. However, use of the methods described above makes it possible to blend strongly reinforcing high-molecular-weight aromatic polyimide or polybenzobisoxazole with a diorganopolysiloxane and also makes possible dispersion of the former in the diorganopolysiloxane matrix at the molecular level. Moreover, even in those cases where curing of the matrix is impaired by the loss of composition fluidity that arises as a consequence of the use of the strongly reinforcing high-molecular-weight aromatic polyimide or polybenzobisoxazole, a crosslinked diorganopolysiloxane molecular composite, in which the aromatic polyimide or polybenzobisoxazole is dispersed at the molecular level, can still be obtained by conducting the cure in the solution and removing the solvent as curing proceeds.

EXAMPLES

The invention will be described in greater detail below using reference examples, working examples, and comparative examples. However, the present invention is in no way limited by these examples. All amounts and percentages are on a weight basis unless indicated to the contrary Reference Example 1

Synthesis of 2-(3-butenyloxy)-4,4'-dinitrobiphenyl
A mixture of 15.0 mL water and 11.0 mL concentrated sulfuric acid was added to 13.0 g of 4,4'-dinitro-2-aminobiphenyl, and the resulting mixture was stirred for 2 hours while heating, whereupon 26.5 g of crushed ice was added. On an ice bath, an aqueous solution of 3.51 g of sodium nitrite was added dropwise to the aforementioned mixture; the resulting system was mixed for 10 minutes and subsequently allowed to stand at quiescence for several minutes. The reaction mixture was then added dropwise to a boiling solution that had been prepared by adding 33.4 mL concentrated sulfuric acid to 25 mL of water. Boiling was continued for 5 minutes, after which the mixture was poured into a beaker on an ice bath. The filter cake afforded by suction filtration was purified by column chromatography to give 10.9 g of 4,4'-dinitro-2-hydroxybiphenyl as a yellowish brown powder.

Next, 10.4 g of the 4,4'-dinitro-2-hydroxybiphenyl thus obtained was dissolved in 95 mL dry acetone. 5.52 g of potassium carbonate and 7.56 g of 4-bromo-1-butene were added, and the resulting mixture was heated under reflux for 71 hours. Workup by the usual methods gave 5.20 g of 2-(3-butenyloxy)-4,4'-dinitrobiphenyl as a light yellow powder.

Reference Example 2

Synthesis 1 of 4,4'-dinitrobiphenyl-containing polysiloxane
2.52 g of the 2-(3-butenyloxy)-4,4'-dinitrobiphenyl synthesized in Reference Example 1 was dissolved in 80 mL of dry toluene. To this was first added 100 microliters of a 3% chloroplatinic acid 2-propanol solution, and a solution in 20 mL dry toluene of 7.88 g of hydrogen-terminated polysiloxane (average value of n: 14.4) with the formula

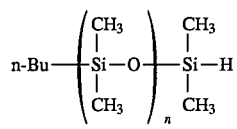

was then added dropwise. Heating was continued for 4 hours at 100° C. Purification by column chromatography yielded 8.68 g of the 4,4'-dinitrobiphenyl-terminated polysiloxane as a waxy light yellow solid.

Reference Example 3

Synthesis 2 of 4,4'-dinitrobimhenyl-containing polysiloxane
6.29 g of 4,4'-dinitrobiphenyl-terminated polysiloxane (average value of n: 46.2) was synthesized by the procedure of Reference Example 2.

Reference Example 4

Synthesis 1 of 4,4'-diaminobiphenyl-containing polysiloxane
270 mg of 5%-Pd/C was suspended in 14 mL of a 1:1 mixed solvent of ethanol and benzene. While passing hydrogen through the system, a solution was added that consisted of 3.21 g of the 4,4'-dinitrobiphenyl-containing polysiloxane (average value of n: 14.4) synthesized in Reference Example 2 dissolved in 14 mL of the same mixed solvent. Hydrogen was injected into the system for 3 hours while stirring. The catalyst was then filtered off and the solvent was distilled under reduced pressure to give 3.00 g of the 4,4'-diaminobiphenyl-terminated polysiloxane as a viscous yellow liquid.

Reference Example 5

Synthesis 2 of 4,4'-diaminobiphenyl-containing polysiloxane
2.25 g of 4,4'-diaminobiphenyl-terminated polysiloxane (average value of n: 46.2) was synthesized by the procedure of Reference Example 4 from the 4,4'-dinitrobiphenyl-containing polysiloxane synthesized in Reference Example 3.

Reference Example 6

Synthesis 1 of polysiloxane-grafted polyamic acid
1.79 g of the 4,4'-diaminobiphenyl-containing polysiloxane (average value of n: 46.2) synthesized in Reference Example 5 was dissolved in 9 mL dry tetrahydrofuran. 0.112 g of pyromellitic dianhydride was added, and the resulting mixture was stirred at room temperature. A glass plate was coated with the polyamic acid solution thus produced, and the solvent was then removed at 30° C. under reduced pressure to give a polyamic acid film.

Reference Example 7

Synthesis of polysiloxane-grafted polyimide
Operating in an argon atmosphere, the polyamic acid film produced in Reference Example 6 was heated for 20 minutes at 60° C., 20 minutes at 100° C., and 2 hours at 200° C. to give a polysiloxane-grafted polyimide film.

Reference Example 8

Synthesis 2 of polysiloxane-grafted polyamic acid
0,201 g of the 4,4'-diaminobiphenyl-containing polysiloxane (average value of n: 14.4) synthesized in Reference Example 4 and 0.496 g of the 4,4'-diaminobiphenyl-containing polysiloxane (average value of n: 46.2) synthesized in Reference Example 5 were dissolved in 5 mL dry tetrahydrofuran. 0.062 g of pyromellitic dianhydride was added, and the resulting mixture was stirred at room temperature. A glass plate was coated with the polyamic acid solution thus produced, and the solvent was removed at 30° C. under reduced pressure to give a polyamic acid copolymer film having two types of side chains with different lengths (ratio of the two types of units: 1:1).

Examples 1 through 14

Polysiloxane-grafted polyimide/polysiloxane blends

Polysiloxane-grafted polyamic acid synthesized according to Reference Example 6 or 8 and polydimethylsiloxane with an average degree of polymerization of 140 or 600 were dissolved in tetrahydrofuran, and the clear solution thus obtained was coated on a glass plate. The solvent was then removed at 30° C. under reduced pressure to give a blend of the polysiloxane-grafted polyamic acid and polydimethylsiloxane. The blend was heated in an argon atmosphere for 20 minutes at 60° C., 20 minutes at 100° C. and 2 hours at 200° C. to give a blend of polysiloxane-grafted polyimide and polydimethylsiloxane. The production of the polyimide was confirmed from the IR spectrum. The characteristic polyimide absorptions at 1780, 1730, 1380, and 725 cm$^{-1}$ were observed, and the absorptions attributable to the amic acid had disappeared. The results are reported in Table 1.

Despite the fact that the polysiloxane-grafted polyimide prepared in Reference Example 7 was a rubber and the polydimethylsiloxanes used in the blends were liquids, the blends obtained in Examples 3, 4, 5, 9, and 10 were solids, and a reinforcement of the polydimethylsiloxanes was thus observed.

TABLE 1

| example number | average value of n | PDMS | content of grafted polyimide (weight %) | content of polyimide main chain (weight %) | compatibility |
| --- | --- | --- | --- | --- | --- |
| 1 | 46.2 | A | 10.4 | 1.0 | good |
| 2 | 46.2 | A | 20.8 | 2.0 | good |
| 3 | 46.2 | A | 37.5 | 3.6 | good |
| 4 | 46.2 | A | 46.9 | 4.5 | good |
| 5 | 46.2 | A | 69.8 | 6.7 | good |
| 6 | 46.2 | B | 9.8 | 0.94 | good |
| 7 | 46.2 | B | 17.7 | 1.7 | good |
| 8 | 46.2 | B | 31.3 | 3.0 | good |
| 9 | 46.2 | B | 46.9 | 4.5 | good |
| 10 | 46.2 | B | 75.0 | 7.2 | good |
| 11 | 14.4/46.2 | A | 56.6 | 7.7 | good |
| 12 | 14.4/46.2 | B | 14.7 | 2.0 | good |
| 13 | 14.4/46.2 | B | 28.7 | 3.9 | good |
| 14 | 14.4/46.2 | B | 58.1 | 7.9 | good |

PDMS = polydimethylsiloxane

In the preceding table, A denotes polydimethylsiloxane with an average degree of polymerization of 140, and B denotes polydimethylsiloxane with an average degree of polymerization of 600. An average value for n of 14.4/46.2 indicates the use of polyamic acid carrying side chains with respective degrees of polymerization of 14.4 and 46.2 at a ratio of 1:1.

Reference Example 9

Synthesis of side chain-free polyamic acid 1.00 g of 4,4'-diaminobiphenyl ether was dissolved in 17 mL of dry N,N-dimethylacetamide. 1.09 g of pyromellitic dianhydride was added, and the resulting mixture was stirred at room temperature. A glass plate was coated with the polyamic acid solution thus obtained, and the solvent was removed at 50° C. under reduced pressure to give a polyamic acid film.

Comparative Example 1

Side chain-free polyamic acid/polysiloxane blend 0.115 g of the polyamic acid obtained in Reference Example 9 and 0.268 g of polydimethylsiloxane with an average degree of polymerization of 600 were dissolved in a mixed solvent (7:3) of tetrahydrofuran and N,N-dimethylacetamide, and a glass plate was coated with the clear solution thus obtained. The polyamic acid and polydimethylsiloxane separated when the solvent was removed under reduced pressure.

Reference Example 10

Synthesis of 2-(3-butenyloxy) terephthalic acid 6.62 g of 1,8-diazabicyclo[5.4.0]undecene and 100 mL benzene were added to 3.76 g hydroxyterephthalic acid (synthesized from bromoterephthalic acid by a known method) and the mixture was heated. 6.76 g of bromoethane dissolved in 38 mL benzene was added dropwise in and the reaction mixture was heated under reflux for 19 hours. The salt product was filtered off, and purification by column chromatography then yielded 4.66 g diethyl hydroxyterephthalate.

3.55 g of this diethyl hydroxyterephthalate was dissolved in 100 mL dimethylformamide and combined with 640 mg of crushed sodium hydroxide. 4.03 g of 4-bromo-1-butene dissolved in 20 mL of dimethylformamide was added dropwise in while cooling on an ice bath. After stirring the reaction for 16 hours, purification by the usual methods gave 1.74 g of diethyl 2-(3-butenyloxy)terephthalate.

1.74 g of this diethyl 2-(3-butenyloxy) terephthalate was dissolved in 12 mL of ethanol, and this solution was added dropwise into an ethanol (17 mL) solution of 1.95 g of crushed potassium hydroxide on an ice bath. The precipitated white solid was recovered and dissolved in water. Neutralization with dilute hydrochloric acid gave 1.15 g of 2-(3-butenyloxy)terephthalic acid.

Reference Example 11

Synthesis of polysiloxane carrying terminal terephthaloyl chloride 1.00 g of 2-(3-butenyloxy) terephthalic acid synthesized according to Reference Example 10, 10 mg of ammonium sulfate, and 7.65 g of hexamethyldisilazane were combined and stirred at 60° C. for 24 hours. The ammonium sulfate was then removed and the excess hexamethyldisilazane was distilled off under reduced pressure to give 1.58 g of bistrimethylsilyl 2-(3-butenyloxy)terephthalate.

1.58 g of this bistrimethylsilyl 2-(3-butenyloxy)terephthalate product was dissolved in 29 mL of dry toluene and 70 microliters of a 3% chloroplatinic acid 2-propanol solution was added. This was followed by the dropwise addition of a toluene solution of 8.12 g of hydrogen-terminated polysiloxane as described in Reference Example 2 with an average value of 26.9 for n. After stirring at 60° C. for 4 hours, the silyl groups were eliminated by hydrolysis to yield 5.90 g of polysiloxane carrying terminal terephthalic acid.

2.70 g of this terephthalic acid-terminated polysiloxane product was stirred at 60° C. for 24 hours with 10 mg of ammonium sulfate and 7.65 g of hexamethyldisilazane. The product was polysiloxane carrying terminal bistrimethylsilyl terephthalate.

This product was stirred with 1.96 g of thionyl chloride at 80° C. for 3 hours. The excess thionyl chloride, etc., was removed under reduced pressure to give 2.70 g of polysiloxane carrying terminal terephthaloyl chloride.

Reference Example 12

Synthesis of 3,3'-bis(trimethylsiloxy)-4,4'-bis(trimethysiylamino)biphenyl 0.540 g of 3,3'-dihydroxy-4,4'-diaminobiphenyl (synthesized from 3,3'-dimethoxy-4,4'-diaminobiphenyl using hydrogen iodide by the known method) and 1.52 g of triethylamine were dissolved in 16 mL of dry tetrahydrofuran. 1.63 g of trimethylchlorosilane was then added dropwise followed by heating under reflux for 72 hours. Operating in an argon atmosphere, the salt was filtered off and the solvent, etc., was removed under reduced pressure to yield 3,3'-bis(trimethylsiloxy)-4,4'-bis(trimethylsilylamino)biphenyl.

Reference Example 13

Synthesis 1 of polysiloxane-grafted silylated polyhydroxyamide

Operating in an argon atmosphere, 0.347 g of the 3,3'-bis(trimethylsiloxy)- 4,4'-bis(trimethylsilylamino)biphenyl synthesized in Reference Example 12 was dissolved in 10 mL of dry tetrahydrofuran. A solution prepared by dissolving 1.64 g of the terephthaloyl chloride-terminated polysiloxane synthesized in Reference Example 11 (average value of n=26.9) in 6 mL of dry tetrahydrofuran was then added dropwise over 30 minutes on a $-20°$ C. to $-15°$ C. bath. After stirring for 4 hours at the same temperature, stirring was continued at room temperature to give the polysiloxane-grafted silylated polyhydroxyamide.

Examples 15 through 17

Blends 1 of polysiloxane-grafted polybenzobisoxazole with polysiloxane

The polysiloxane-grafted silylated polyhydroxyamide synthesized in Reference Example 13 and polydimethylsiloxane with an average degree of polymerization of 600 were dissolved in tetrahydrofuran, and a glass plate was coated with the clear solution thus obtained. The solvent was then removed at 30° C. under reduced pressure to give a blend of the polysiloxane-grafted silylated polyhydroxyamide and the polydimethylsiloxane. This blend was subsequently heated for 19 hours at 300° C. in an argon atmosphere to give a blend of polysiloxane-grafted polybenzobisoxazole and polydimethylsiloxane. The production of the polybenzobisoxazole was confirmed in each case by the disappearance of absorptions attributable to NH (at 3300, 1645 and 1512 cm$^{-1}$) in the IR spectrum. The results are reported in Table 2.

TABLE 2

| example number | content of grafted polybenzobisoxazole (weight %) | content of polybenzobisoxazole main chain (weight %) | compatibility |
|---|---|---|---|
| 15 | 15.7 | 2.0 | good |
| 16 | 31.0 | 4.0 | good |
| 17 | 46.0 | 6.0 | good |

Reference Example 14

Synthesis of polysiloxane-grafted polyhydroxyamide

A reaction solution as produced in Reference Example 13 was poured into a large quantity of methanol, and the precipitated polysiloxane-grafted polyhydroxyamide was recovered by filtration and drying.

Example 18

Blend 2 of polysiloxane-grafted polybenzobisoxazole with polysiloxane

A blend (content of polybenzobisoxazole main chain: 4.0 weight %) of polysiloxane-grafted polybenzobisoxazole and polydimethylsiloxane was prepared by the procedure of Example 15 through 17 using the polysiloxane-grafted polyhydroxyamide obtained in Reference Example 14 and polydimethylsiloxane with an average degree of polymerization of 600. The compatibility of this blend was good.

Reference Example 15

Synthesis of side chain-free silylated polyhydroxyamide

Operating in an argon atmosphere, 0.722 g of the 3,3'-bis(trimethylsiloxy)- 4,4'-bis(trimethylsilylamino)biphenyl synthesized in Reference Example 12 was dissolved in 5 mL of dry N,N-dimethylacetamide, and the resulting solution was solidified on a dry ice/ethanol bath. The solution prepared by dissolving 0.290 g of terephthaloyl chloride in 2 mL of N,N-dimethylacetamide was then added. While stirring was continued, the bath was gradually warmed from 0° C. to room temperature, thus synthesizing the silylated polyhydroxyamide.

Comparative Example 2

Blend of side chain-free silylated polyhydroxyamide and polysiloxane 0.135 g of the silylated polyhydroxyamide synthesized in Reference Example 15 and 0.315 g of polydimethylsiloxane with an average degree of polymerization of 600 were dissolved in a mixed solvent (1:1) of tetrahydrofuran and N,N-dimethylacetamide, and a glass plate was coated with the clear solution thus obtained. The polyhydroxyamide and polydimethylsiloxane separated when the solvent was removed under reduced pressure.

Reference Example 16

Synthesis of 2-(3-butenyloxy) terephthaloyl chloride 0.100 g of the 2-(3-butenyloxy) terephthalic acid synthesized in Reference Example 10 was dissolved in 5 mL of benzene. 0.757 g of thionyl chloride was added, and this mixture was stirred for 3.5 hours at 80° C. The excess thionyl chloride and the solvent were removed under reduced pressure to give 2-(3-butenyloxy)terephthaloyl chloride quantitatively.

Reference Example 17

Synthesis 2 of polysiloxane-grafted silylated polyhydroxyamide

Using 0.620 g of the 3,3'-bis(trimethylsiloxy)-4,4'-bis(trimethylsilylamino)biphenyl synthesized in Reference Example 12, 2.70 g of the terephthaloyl chloride-terminated polysiloxane (average value of n =26.9) synthesized in Reference Example 11, and 33.6 mg of the 2-(3-butenyloxy)terephthaloyl chloride synthesized in Reference Example 16, a silylated polyhydroxyamide was synthesized by the procedure of Reference Example 13. This silylated polyhydroxyamide had a polysiloxane-grafted monomer unit/3-butenyloxy-substituted monomer unit molar ratio of 9:1.

Example 19

Polybenzobisoxazole/silicone rubber molecular composite 1

2.00 g of polydimethylsiloxane carrying the vinyl group at both terminals (vinyl group content: 0.12 weight %) and 50.0 mg of the silylated polyhydroxyamide synthesized in Reference Example 17 (polysiloxane-grafted monomer unit/ 3-butenyloxy-substituted monomer unit molar ratio =9:1)

were dissolved in tetrahydrofuran. 10 microliters of a 0.034% tetrahydrofuran solution of a platinum-divinyltetramethyldisiloxane complex, 10 microliters of a 0.15% tetrahydrofuran solution of 2-methyl-3-butyn-2-ol, and 22 mg of crosslinker with the formula

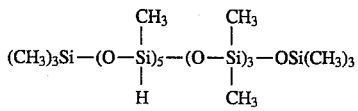

were added to this solution, and the resulting mixture was poured into a stainless steel casting mold. The polysiloxane was then cured while removing the solvent by heating the mixture for 1 hour at 60° C., 2 hours at 80° C., and 19 hours at 100° C., which gave a silicone rubber film that contained silylated polyhydroxyamide. This film was heated for 19 hours at 300° C. in an argon atmosphere, thus producing a film of a silicone rubber molecular composite that contained 0.3 weight % polybenzobisoxazole main chain. When this film was subjected to tensile testing, the tensile strength was 2.3 kg/cm² and the elongation at break was 320%.

Example 20

Polybenzobisoxazole/silicone rubber molecular composite 2

A terephthaloyl chloride-terminated polysiloxane with an average value for n of 6.9 was synthesized by the procedure of Reference Example 11. Using this polysiloxane, a silylated polyhydroxyamide was synthesized by the procedure of Reference Example 17. This silylated polyhydroxyamide had a polysiloxane-grafted monomer unit/3-butenyloxy-substituted monomer unit molar ratio of 9:1, and the average value of n for its side chains was 6.9. The procedure of Example 19 was used to prepare a film of a silicone rubber molecular composite that contained 0.3 weight % polybenzobisoxazole main chain. When this film was subjected to tensile testing, the tebsuke strength was 5.7 kg/cm² and the elongation at break was 450%.

Comparative Example 3

Unfilled silicone rubber

An unfilled silicone rubber was produced by the procedure of Example 19 using the same vinyl-endblocked polydimethylsiloxane, platinum-divinyltetramethyldisiloxane complex, 2-methyl-3-butyn-2-ol, and crosslinker as in Example 19. The rubber film produced by heating this unfilled silicone rubber for 19 hours at 300° C. in the same manner as in Example 19 was also subjected to tensile testing: the tensile strengths was 1.5 kg/cm² and the elongation at break was 320%.

We claim:

1. A composition comprising:
   (i) 1 to 99.99 percent by weight of a diorganopolysiloxane; and
   (ii) 0.01 to 99 percent by weight of an organopolysiloxane-grafted rigid linear aromatic polymer selected from the group consisting of organopolysiloxane-grafted polyimide and organopolysiloxane-grafted polybenzobisoxazole.

2. The composition according to claim 1, wherein said organopolysiloxane-grafted rigid linear aromatic polymer is a polyimide having repeating units represented by the formulas I and II

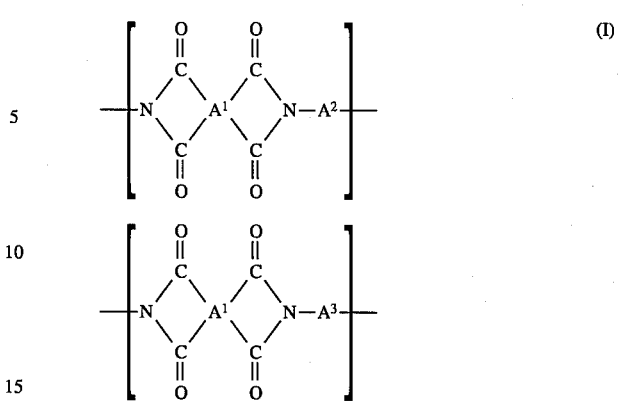

in which
A¹ denotes a tetravalent aromatic group,
A² denotes a divalent aromatic group on which there is bonded one or two organopolysiloxane groups having the formula (III)

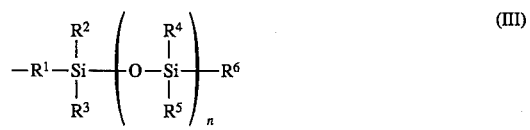

in which R¹ denotes a divalent organic group having at least 2 carbon atoms, R² through R⁶ independently denote monovalent organic groups and n is an integer having a value of at least 1 and A³ comprises at least one group selected from the group consisting of reactive side chain-free divalent aromatic groups and reactive side chain-substituted divalent aromatic groups, with the proviso that the molar ratio of reactive side chain-free divalent aromatic groups to reactive side chain-substituted divalent aromatic groups is in the range of 100/0 to 0/100 and with the further proviso that the molar ratio of the repeating unit shown in the formula (I) to the repeating unit shown in the formula (II) is in the range of 100:0 to 1:99.

3. The composition according to claim 2, wherein R² through R⁵ in formula (III) are methyl groups.

4. The composition according to claim 2, wherein said diorganopolysiloxane (i) is a polydimethylsiloxane.

5. The composition according to claim 3, wherein said diorganopolysiloxane (i) is a polydimethylsiloxane.

6. The composition according to claim 1, wherein said organopolysiloxane-grafted rigid linear aromatic polymer is an organopolysiloxane-grafted polybenzobisoxazole comprising repeat units having formulas (XII) and (XIII), wherein the repeat unit (XII)/repeat unit (XIII) molar ratio is in the range of 100/0 to

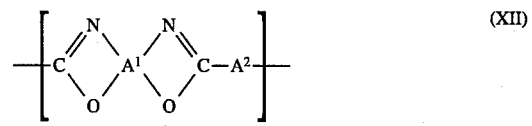

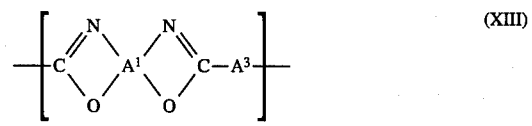

in which
A¹ denotes a tetravalent aromatic group, $A^2$ denotes a divalent aromatic group on which there is bonded one or two organopolysiloxane groups having the formula (III)

in which $R^1$ denotes a divalent organic group having at least 2 carbon atoms, $R^2$ through $R^6$ independently denote monovalent organic groups and n is an integer having a value of at least 1 and $A^3$ comprises at least one group selected from the group consisting of reactive side chain-free divalent aromatic groups and reactive side chain-substituted divalent aromatic groups, with the proviso that the molar ratio of reactive side chain-free divalent aromatic groups to reactive side chain-substituted divalent aromatic groups is in the range of 100/0 to 0/100.

7. The composition according to claim 6, wherein $R^2$ through $R^5$ in formula (III) are methyl groups.

8. The composition according to claim 7, wherein said diorganopolysiloxane (i) is polydimethylsiloxane.

9. The composition according to claim 6, wherein the reactive side chain in $A^3$ is an ethylenically unsaturated organic group.

10. The composition according to claim 7, wherein the reactive side chain in $A^3$ is an ethylenically unsaturated organic group.

11. The composition according to claim 8, wherein the reactive side chain in $A^3$ is an ethylenically unsaturated organic group.

12. The composition according to claim 6, wherein said diorganopolysiloxane (i) is a polydimethylsiloxane.

13. The composition according to claim 1, wherein said composition is cured.

14. The composition according to claim 2, wherein said composition is cured.

15. The composition according to claim 4, wherein said composition is cured.

16. The composition according to claim 6, wherein said composition is cured.

17. The composition according to claim 8, wherein said composition is cured.

18. A method for preparing the composition of claim 1 comprising:

(i) preparing a homogeneous organic solvent solution of said diorganopolysiloxane and a solvent-soluble precursor polymer for said organopolysiloxane-grafted aromatic polyimide or a solvent-soluble precursor polymer for said organopolysiloxane-grafted polybenzobisoxazole; and (ii) thermally cyclizing the precursor polymer after elimination of the organic solvent.

19. A method for preparing the cured composition according to claim 13, comprising:

(i) preparing a homogeneous organic solvent solution of said diorganopolysiloxane and a solvent-soluble precursor polymer for said organopolysiloxane-grafted aromatic polyimide or a solvent-soluble precursor polymer for said organopolysiloxane-grafted polybenzobisoxazole;

(ii) curing said diorganopolysiloxane, either after elimination of the organic solvent or in parallel therewith; and (iii) thermally cyclizing the precursor polymer.

20. The method according to claim 19, wherein said organopolysiloxane-grafted aromatic polyimide or said organopolysiloxane-grafted polybenzobisoxazole contains at least one reactive group capable of bonding with said diorganopolysiloxane.

21. A composition comprising:

(i) 1 to 99.99 percent by weight of a diorganopolysiloxane; and (ii) 0.01 to 99 percent by weight of an organopolysiloxane-grafted rigid linear polybenzobisoxazole polymer.

22. The composition according to claim 21, wherein said composition is cured.

23. A method for preparing the composition of claim 21 comprising:

(i) preparing a homogeneous organic solvent solution of said diorganopolysiloxane and a solvent-soluble precursor polymer for said organopolysiloxane-grafted polybenzobisoxazole; and (ii) thermally cyclizing the precursor polymer after elimination of the organic solvent.

24. A method for preparing the cured composition according to claim 22, comprising:

(i) preparing a homogeneous organic solvent solution of said diorganopolysiloxane and a solvent-soluble precursor polymer for said organopolysiloxane-grafted polybenzobisoxazole;

(ii) curing said diorganopolysiloxane, either after elimination of the organic solvent or in parallel therewith; and (ii) thermally cyclizing the precursor polymer.

25. The method according to claim 24, wherein said organopolysiloxane-grafted polybenzobisoxazole contains at least one reactive group capable of bonding with said diorganopolysiloxane.

* * * * *